United States Patent
Erbes et al.

(10) Patent No.: US 6,236,700 B1
(45) Date of Patent: May 22, 2001

(54) DOWNCOMMER COUPLING APPARATUS AND METHODS

(75) Inventors: John G. Erbes, Mt. View; David L. Rousar; Michael R. Schrag, both of San Jose, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/252,699

(22) Filed: Feb. 18, 1999

Related U.S. Application Data

(60) Provisional application No. 60/075,986, filed on Feb. 25, 1998.

(51) Int. Cl.[7] ............................. G21C 19/00; F16L 55/00
(52) U.S. Cl. ..................... 376/260; 376/203; 376/282; 376/286; 376/361; 285/404; 285/15
(58) Field of Search ................................ 376/282, 260, 376/361, 203, 286; 285/404, 15

(56) References Cited

U.S. PATENT DOCUMENTS

| | | | |
|---|---|---|---|
| 1,650,102 | * | 11/1927 | Tschappat . |
| 1,731,761 | * | 10/1929 | Bulmahn . |
| 2,031,654 | * | 2/1936 | Howard .................................. 166/14 |
| 2,207,471 | * | 7/1940 | Yancey ................................... 166/14 |
| 2,563,851 | * | 8/1951 | Lundeen et al. ........................ 24/263 |
| 2,687,229 | * | 8/1954 | Laurent .................................. 220/46 |
| 4,048,267 | * | 9/1977 | Walker et al. ......................... 261/122 |
| 4,238,291 | * | 12/1980 | Neuenfeldt et al. .................... 176/38 |
| 4,452,474 | * | 6/1984 | Hagner ............................... 285/334.1 |
| 4,647,084 | * | 3/1987 | Hagin et al. ........................ 285/332.1 |
| 4,648,632 | * | 3/1987 | Hagner ............................... 285/334.1 |
| 4,832,379 | * | 5/1989 | Smith et al. ........................... 285/323 |
| 4,840,409 | * | 6/1989 | Welkey ................................. 285/167 |
| 4,887,849 | * | 12/1989 | Briet ....................................... 285/91 |
| 5,466,107 | * | 11/1995 | Percival-Smith ...................... 411/546 |
| 5,735,551 | * | 4/1998 | Whitman et al. ....................... 285/15 |
| 5,737,380 | * | 4/1998 | Deaver et al. ......................... 376/352 |
| 5,806,833 | * | 9/1998 | Riibe .................................... 251/305 |
| 5,912,936 | * | 6/1999 | Charnley et al. ..................... 376/282 |

* cited by examiner

*Primary Examiner*—Michael J. Carone
*Assistant Examiner*—Jack Keith
(74) *Attorney, Agent, or Firm*—Armstrong Teasdale LLP

(57) ABSTRACT

Downcommer coupling apparatus and methods for replacing a core spray line downcommer pipe coupled to a shroud T-box are described. In one embodiment, the coupling apparatus includes a wedge flange, a wedge, a wedge housing, a pipe seal, a cylindrical pipe, an elbow, a lower flange, and a shroud seal. The downcommer pipe is connected to the coupling apparatus by extending the pipe through the wedge flange, the wedge, and the wedge housing. The wedge has a plurality of flexible thinned segments that extend into the wedge housing to secure the downcommer pipe to the wedge housing. Wedge flange bolts extend through the wedge flange, the wedge, and the wedge housing to rigidly secure the downcommer pipe to the coupling apparatus. Dowel bolts extend through the wedge housing and the downcommer pipe to provide vertical and torsional load transfer from the downcommer pipe to the coupling apparatus. The lower flange is configured to receive the shroud T-box. In one embodiment two lower flange bolts extend through the shroud and into the nutbar to secure the coupling apparatus to the shroud. A third lower flange bolt extends through the shroud and secures the clamp to the t-box. The clamp prevents axial movement of the T-box.

20 Claims, 4 Drawing Sheets

DOWNCOMMER COUPLING APPARATUS AND METHODS

CROSS-REFERENCE TO RELATED APPLICATIONS

This application claims the benefit of U.S. Provisional Application No. 60/075,986 filed Feb. 25, 1998.

BACKGROUND OF THE INVENTION

This invention relates generally to nuclear reactors and more particularly, to apparatus and methods for coupling piping within reactor pressure vessels of such reactors.

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spray spargers inside the RPV. The core spray piping and spargers deliver water flow to the reactor core.

Stress corrosion cracking (SCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as T-boxes and core spray line downcommers, occasionally require replacement as a result of SCC. Replacing the core spray piping often requires removing and replacing the core spray line downcommer. The core spray line downcommer attachment to the shroud, however, typically is installed during original reactor construction and is difficult to access. In addition, replacing the core spray line downcommer is complicated by the limited available working space.

The core spray line downcommer includes a lower elbow secured to a shroud core spray sparger T-box. Installing a replacement downcommer pipe into the reactor requires that the replacement lower elbow be welded to the shroud. However, as explained above, it is difficult to access this area of the reactor.

It would be desirable to provide an apparatus which facilitates replacing a core spray line downcommer attached to the shroud core spray sparger T-box. It would also be desirable to provide such an apparatus which is installed without the necessity of field welding.

BRIEF SUMMARY OF THE INVENTION

Replacement of a lower elbow section of a downcommer pipe without field welding may be attained by a downcommer pipe coupling apparatus which, in one embodiment, includes a wedge, a wedge flange, and a wedge housing. The wedge is a split tapered sleeve having a plurality of flexible thinned segments extending lengthwise. The separate wedge flange is configured to be located over the wedge and includes two openings sized for wedge flange bolts with each opening having a square recess to mate with a bolt locking collar. The wedge housing is substantially frustroconical shaped and has a wedge housing flange at a larger diameter end, a tapered bore matching the wedge, and two opposing threaded dowel bolt openings threaded to receive dowel bolts. Each dowel bolt opening has a square recess to mate to a bolt locking collar.

The downcommer pipe is coupled to the apparatus using two wedge flange bolts and two dowel bolts. Particularly, the wedge flange bolts extend through the wedge flange and into the wedge housing so that as the wedge flange bolts are secured, the wedge clamps the downcommer pipe tightly to the wedge housing. The dowel bolts extend through the dowel bolt openings and the downcommer pipe, forming a shear connection between the wedge housing and the downcommer pipe. The tightened wedge, wedge housing and downcommer pipe form a rigid connection which is aligned to the downcommer pipe and the dowel bolt openings.

The apparatus further includes a substantially cylindrical pipe connected to the smaller diameter end of the wedge housing, an elbow connected to the second end of the cylindrical pipe, and a substantially circular shaped lower flange connected to the second end of the elbow. The lower flange includes a T-box opening having an inner diameter sized to receive a portion of a T-box extending from the shroud, and a circular lip on the lower flange face is configured to engage the shroud spot face to transmit applied piping shear loads and the joint preload forces. The lower flange also includes eight lower flange bolt openings sized to receive lower flange bolts. Each lower flange bolt opening has a square recess to mate to a bolt locking collar. Lower flange bolts are installed in three of the eight possible locations, depending on the available access.

Additionally, the coupling apparatus includes a nutbar and a substantially L-shaped clamp having a bolt opening sized to receive one of the lower flange bolts. The nutbar is sized to receive two lower flange bolts using the connection of the two nuts to act as an anti-rotational mechanism. The clamp is sized to axially restrain the T-box to the shroud so that the T-box does not move inward toward the reactor core.

The two connecting ends of the coupling apparatus are provided with seals to minimize leakage. Both the pipe seal and T-box seal are double diaphragm type seals which are self-energizing so that the pressure difference tending to cause leakage also increases the seal surface contact force, tightening the seal. This flexible type of seal minimizes the added joint load required to accomplish sealing, so the sizing of the required bolts and bolt openings is minimized to fit in the available access. In particular, access on the inside of the shroud is limited by numerous existing core spray sparger nozzles.

The coupling apparatus is mechanically joined to the shroud and downcommer pipe with sufficient strength and stiffness to react the originally specified piping loads from seismic, weight, thermal expansion and hydraulic conditions without significantly changing the piping system loads. The wedge and wedge housing grip the downcommer pipe tightly over a sufficient length to develop the full bending strength and stiffness of a continuous pipe.

The dowel bolts are sized to react the axial twisting and vertical loads. The bolted lower flange connection to the shroud is a similarly stiff connection, with the bolt preload sufficient to prevent separation of the lower flange from the shroud. Placement of the lower flange bolts outside the downcommer pipe minimizes the preload change due to temperature transients in the fluid inside the downcommer pipe.

The coupling apparatus is constructed, typically, of materials matching the thermal properties of the attached downcommer pipe and shroud, for example, 316 stainless steel. Components of the coupling apparatus are fabricated to ease assembly, provide strength, and provide optimum corrosion resistance.

To install the coupling apparatus, a lower portion of the existing downcommer pipe is removed, for example, by cutting-off a portion of the downcommer pipe near the lower elbow and removing the lower elbow from the shroud. Two dowel bolt openings are then machined in the downcommer pipe, aligned with the shroud outside diameter and downcommer pipe end. A circular groove surrounding the T-box in the shroud outside diameter and the cut end of the T-box are then spot face machined to the correct depth. Three lower flange bolt openings are then machined through the shroud at accessible locations.

After inserting the pipe seals into the wedge housing and lower flange groove, the replacement coupling apparatus, wedge flange, wedge, and wedge housing are installed over the end of the downcommer pipe, until the downcommer pipe is seated against the seal inside the bottom of the wedge housing. The two dowel bolts are then engaged through the wedge housing into the downcommer pipe openings, aligning the coupling apparatus to the shroud outside diameter and applying a controlled compression to the pipe seal.

The coupling apparatus is then coupled to the shroud. The lower flange is placed adjacent to the shroud so that the lower flange lip engages the shroud spotface and the T-box extends into the lower flange opening seating against the T-box seal. Two lower flange bolts are then extended through the lower flange and shroud bolt openings and the nutbar. The third lower flange bolt is extended through the lower flange, shroud, and clamp bolt openings and a nut. The lower flange bolts secure the coupling apparatus lower flange to the shroud.

The downcommer pipe is then secured to the coupling apparatus by tightening the two wedge flange bolts through the wedge flange into the wedge housing to compress the wedge. As the wedge flange bolts are tightened, the wedge is clamped between the wedge flange and the wedge housing. As a result, the wedge is inserted into the wedge housing, compressing against the downcommer pipe and tightly connecting the downcommer pipe to the coupling apparatus. After final torquing, the wedge flange, dowel, and lower flange bolts are locked against rotation by crimping locking collars into grooves provided in the bolt heads.

The above-described apparatus facilitates replacing a lower portion of a downcommer pipe. The coupling apparatus is mechanically joined to the shroud and the downcommer pipe therefore avoiding field welding in the limited space surrounding the downcommer pipe on material which has evidenced cracking from the original attachment welds. Additionally, the resulting connection between the downcommer pipe and the shroud T-box is a permanent replacement.

DETAILED DESCRIPTION OF THE INVENTION

Figure 1:
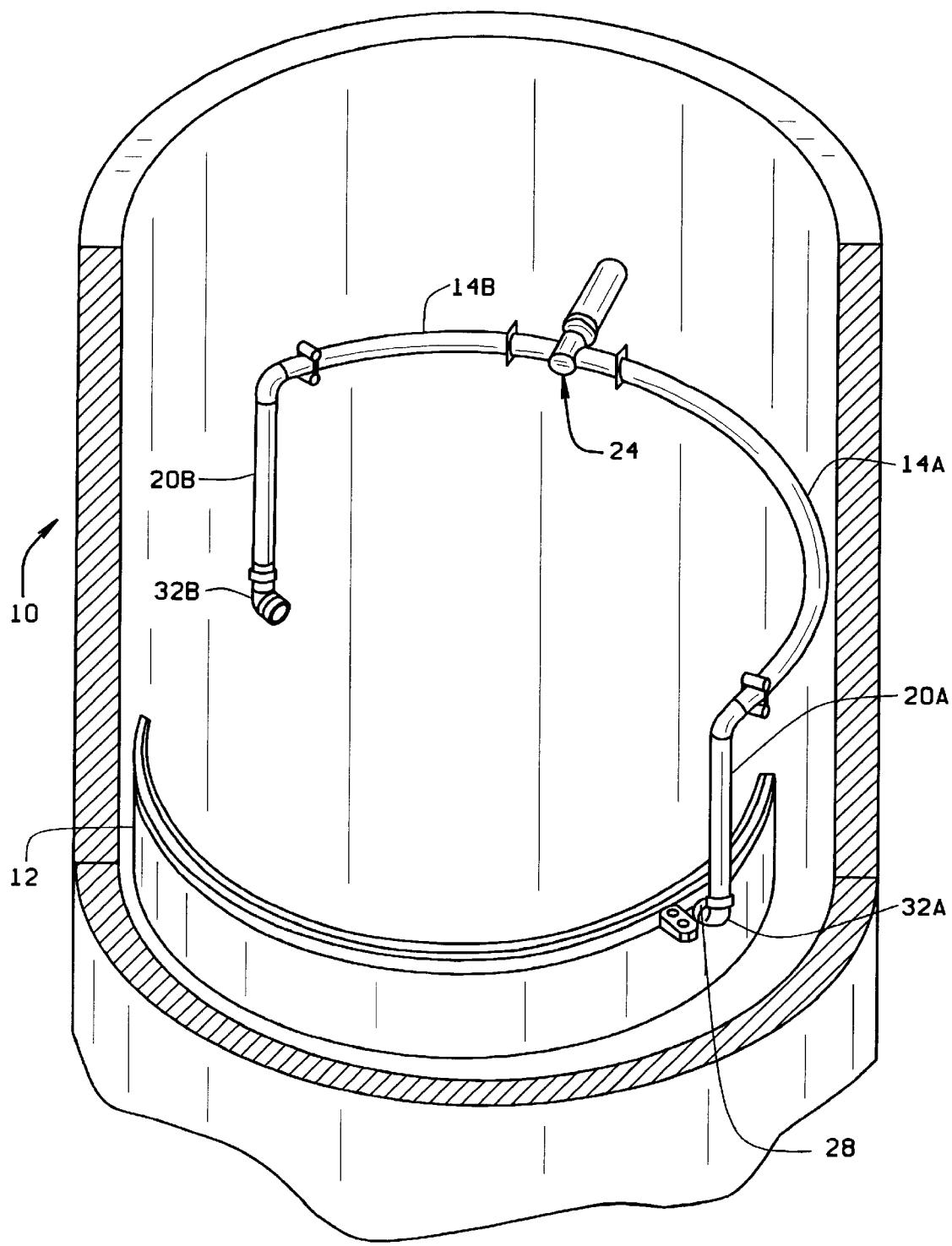
FIG. 1 is a perspective view of a reactor core spray line downcommer connecting to the upper portion of a shroud.

FIG. 1 is a perspective view with parts cut away of a reactor pressure vessel (RPV) 10. RPV 10 includes a shroud 12, core spray line laterals 14A and 14B, downcommer pipes 20A and 20B, a T-box junction 24, a T-box 28, and core spray spargers (not shown in FIG. 1). Downcommer pipes 20A and 20B include a lower elbow 32A and 32B. Lower elbows 32A and 32B are typically welded to shroud 12.

Figure 2:
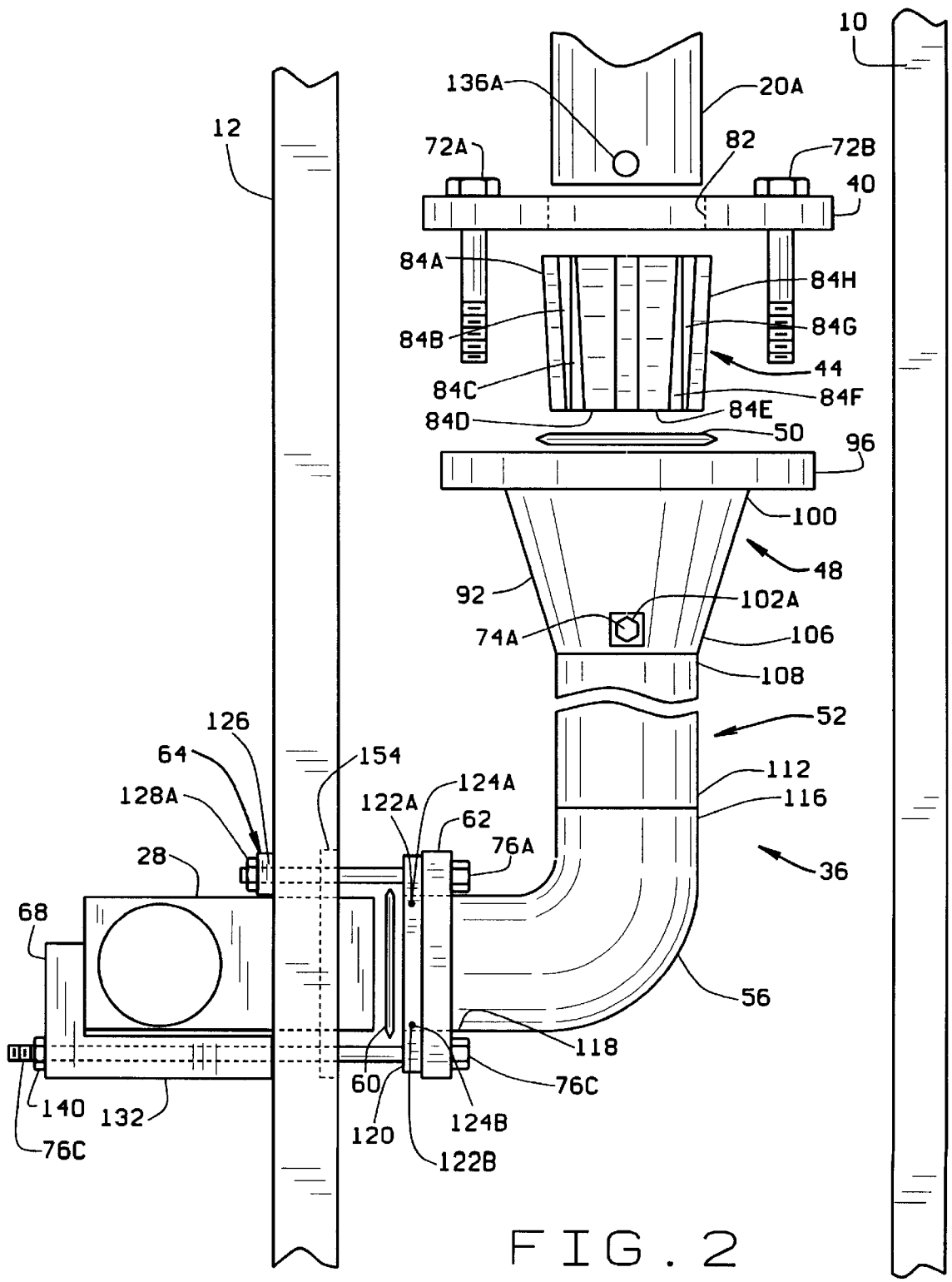
FIG. 2 is a side elevation view of a portion of a core spray line and replacement downcommer coupling apparatus in accordance with one embodiment of the present invention.
Figure 3:
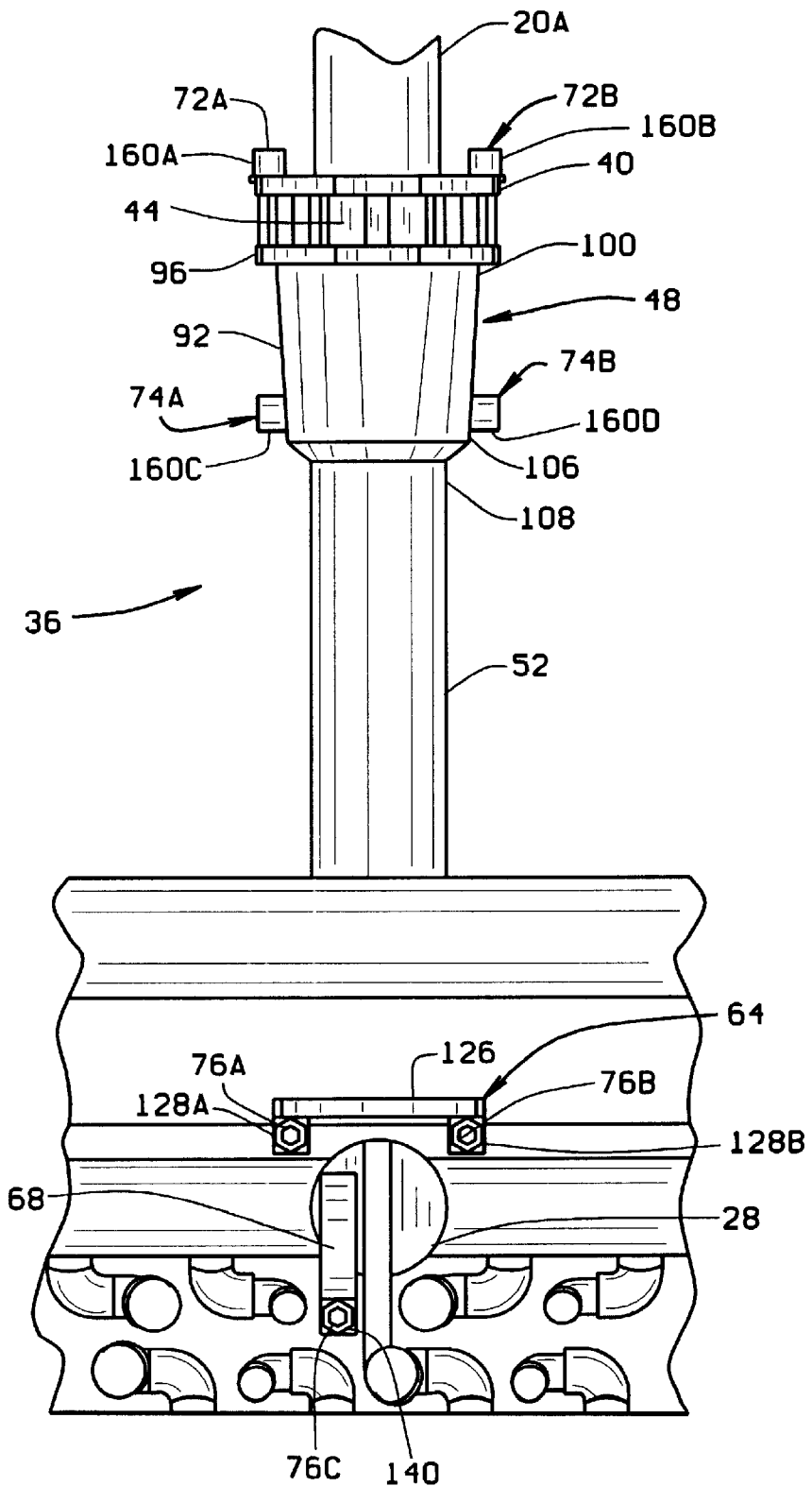
FIG. 3 is a radial elevation view with parts cut away from inside the shroud showing a T-box and the downcommer coupling apparatus.
Figure 4A:
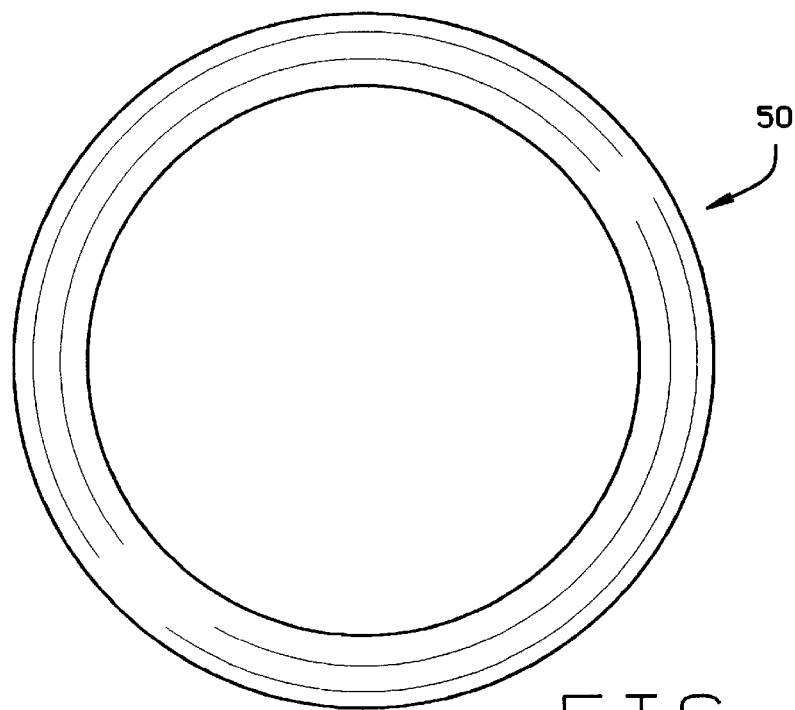
FIG. 4A is a top view of a pipe seal shown in FIG. 2.
Figure 4B:
FIG. 4B is a side view of the pipe seal shown in FIG. 4A.
Figure 5:
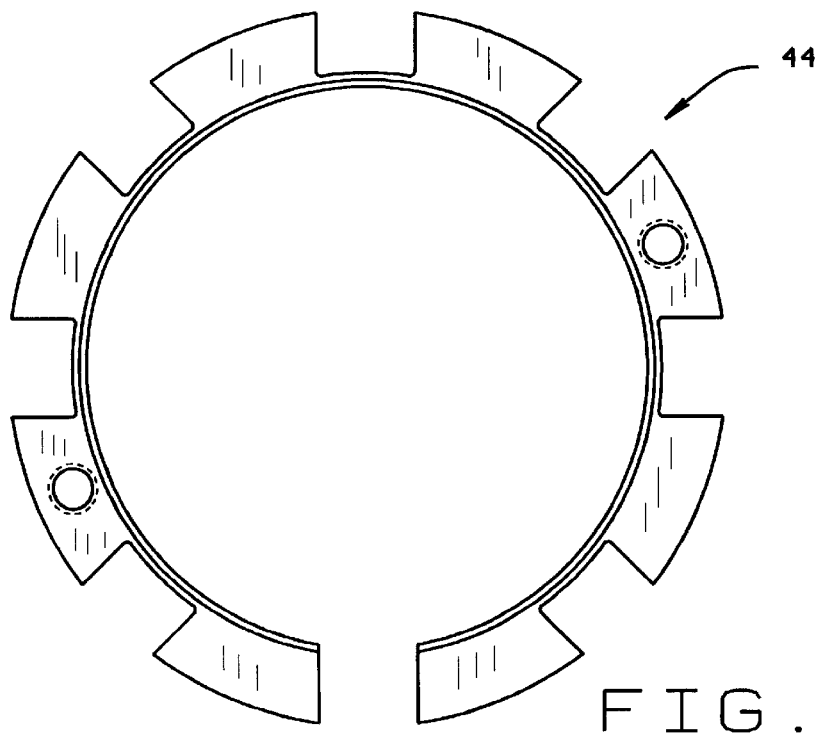
FIG. 5 is a top view of a wedge shown in FIG. 2.

As shown in FIG. 2, downcommer pipe 20A is located between shroud 12 and a wall of reactor pressure vessel 10. Particularly, downcommer pipe 20A is located about sixty feet under water, in an annulus between shroud 12 and the RPV wall having a width of about twelve to fifteen inches, and in a high radiation zone. Until now, the limited accessibility makes welding of replacement downcommer pipes impractical.

A downcommer coupling apparatus constructed in accordance with the present invention facilitates replacement of downcommer pipes. Specifically, and referring to FIGS. 2, 3, 4A, 4B, and 5, a downcommer coupling apparatus 36 constructed in accordance with one embodiment of the present invention includes a wedge flange 40, a wedge 44, a wedge housing 48, a pipe seal 50, a substantially cylindrical pipe 52, an elbow 56, a T-box seal 60, a lower flange 62, a nutbar 64, and a clamp 68. Downcommer coupling apparatus 36 further includes wedge flange bolts 72A and 72B, dowel bolts 74A and 74B, and lower flange bolts 76A, 76B, and 76C. Wedge flange 40 includes wedge flange bolt openings (not shown) and an opening (not shown) sized to receive downcommer pipe 20A. Wedge 44 is a split tapered sleeve having, in one embodiment, flexible thinned segments 84A, 84B, 84C, 84D, 84E, 84F, 84G, and 84H extending substantially lengthwise and a substantially circular opening (not shown) sized to receive downcommer pipe 20A.

Wedge housing 48 includes a frustro-conical portion 92 and a wedge housing flange 96 at a larger diameter end 100 of frustro-conical portion 92, and dowel bolt openings 102A and 102B (only one shown). Wedge housing flange 96 includes two wedge flange bolt openings (not shown) sized to receive wedge flange bolts 72A and 72B. Pipe seal 50 is a double diaphragm type seal sized to be positioned within wedge housing 48 adjacent frustro-conical smaller end 106 so that downcommer pipe 20A clamps seal 50 against wedge housing 48. Flexible seal 50 is self-energizing so that the pressure difference tending to cause leakage also increases the seal surface contact force, tightening the seal. Seal 50 minimizes the added joint load required to accomplish sealing, so the sizing of required respective dowel and wedge flange bolts 74A, 74B, 72A and 72B, dowel bolt openings 102A and 102B, and the wedge flange bolt openings is minimized to fit within the available access.

Pipe 52 is substantially cylindrical having a first end 108 and a second end 112. Pipe first end 108 is coupled to wedge housing smaller diameter end 106. Pipe second end 112 is coupled to a lower elbow first end 116. Lower elbow second end 118 is coupled to lower flange 62. Lower flange 62 includes a T-box opening (not shown), eight lower flange bolt openings (not shown), and a circular lip 120 having taper pin openings 122A, 122B, and 122C (only two shown). Lower flange T-box opening is sized to receive a portion of T-box 28. Each of the eight lower flange bolt openings has a square recess (not shown) to mate with bolt locking collars (not shown). T-box seal 60 is a double diaphragm type seal identical to pipe seal 50.

Lower flange bolts 76A, 76B, and 76C are sized to extend through three of the lower flange bolt openings depending on the available access. Taper pin openings 98A, 98B, and 98C extend radially through lower flange lip 120 and are sized to receive taper pins 124A, 124B, and 124C (only two shown). Taper pins 124A, 124B, and 124C are sized to extend through lower flange taper pin openings 122A, 122B, and 122C and hold T-box seal 60 in proper position during installation.

Nutbar 64 includes a member 126 and nuts 128A and 128B. Member 126 includes two openings (not shown) sized to receive lower flange bolts 76A and 76B. Clamp 68 is substantially L-shaped and includes a bolt opening (not shown) extending through one leg 132 sized to receive lower flange bolt 76C. Wedge flange bolts 72A and 72B are configured to extend through wedge flange 40 and wedge housing 96 wedge flange bolt openings. Dowel bolts 74A and 74B are configured to extend through wedge housing dowel bolt openings 102A and 102B and downcommer pipe dowel bolt openings 136A and 136B (only one shown).

In replacing the lower portion of downcommer pipe 20A, including lower elbow 32A, downcommer pipe 20A is cut-off between core spray line lateral 14A and lower elbow 32A. Lower elbow 32A is then removed from shroud T-box 28. Dowel bolt openings 136A and 136B are formed, typically by machining, near the end of downcommer pipe 20A to be coupled with coupling apparatus 36. Circular groove 154 is then formed in the outer diameter of shroud 12 around T-box 28, typically by spotface machining to the correct depth. Groove 154 provides shear constraint for coupling apparatus 36 and is sized to receive lower flange lip 120 so that lower flange 62 is adjacent to shroud 12. A portion of T-box 28 extending from shroud 12 is cut to the proper length, for example by spot face machining. Three lower flange bolt openings (not shown) are then formed, typically by machining, in shroud 12 at accessible locations aligned with three of the eight lower flange bolt openings (not shown).

The replacement continues by inserting downcommer pipe 20A into wedge housing 48 so that pipe seal 50 is between downcommer pipe 20A and wedge housing 48. Dowel bolts 74A and 74B extend into respective threaded wedge housing dowel bolt openings 102A and 102B and into respective downcommer pipe dowel bolt openings 136A and 136B.

Lower flange 62 is positioned adjacent shroud 12 so that T-box 28 is received by lower flange 62. Lower flange bolts 76A, 76B, and 76C are extended through lower flange bolt openings in lower flange 62 and shroud 12. Nutbar 64 is then positioned inside shroud 12, and lower flange bolts 76A and 76B are extended through nutbar member 124 and engaged to nutbar nuts 128A and 128B. Clamp 68 is then positioned so that lower flange bolt 76C extends into the clamp bolt opening and clamp 68 is positioned adjacent to T-box 28. Lower flange bolt 76C is then secured with a nut 140 to constrain T-box 28.

Wedge flange bolts 72A and 72B are then torqued to clamp wedge 44 between wedge flange 40 and wedge housing 48 thereby forming a rigid joint between coupling apparatus 36 and downcommer pipe 20A. After torquing dowel bolts 74A and 74B and lower flange bolts 76A, 76B, and 76C, locking collars 160A, 160B, 160C, 160D, 160E, 160F, and 160G (only four shown) are positioned in square recesses and crimped into grooves (not shown) in heads of bolts 72A, 72B, 74A, 74B, 76A, 76B, and 76C preventing rotation.

As explained above, coupling apparatus 36 is mechanically joined to shroud 12 and downcommer pipe 20A with sufficient strength and stiffness to react the originally specified piping loads from seismic, weight, thermal expansion and hydraulic conditions without significantly changing the piping system loads. Wedge 44 and wedge housing 48 grip downcommer pipe 20A tightly over a sufficient length to develop the full bending strength and stiffness of a continuous pipe.

Dowel bolts 74A and 74B are sized to react the axial twisting and vertical loads. The bolted connection of lower flange 62 to shroud 12 is a similarly stiff connection, with the bolt preload sufficient to prevent separation of lower flange 62 from shroud 12. Placement of lower flange bolts 76A, 76B, and 76C outside pipe 20A minimizes the preload change due to temperature transients in the fluid inside downcommer pipe 20A. These transients can be significant, as downcommer pipe 20A is used to inject emergency cooling water at low temperature (about 50 degrees F) into shroud 12 which is, typically, above 500 degrees F. Temperatures of lower flange bolts 76A, 76B, and 76C thus tend to follow that of attached lower flange 62 and shroud 12 so that lower flange to shroud joint is neither over stressed or loosened by thermal differential expansion.

Coupling apparatus 36 is constructed, typically, of type 316 stainless steel, matching the thermal properties of attached downcommer pipe 20A and shroud 12. Coupling apparatus 36 is given a solution heat treatment to remove weld residual stress and provide optimum corrosion resistance. Surfaces of wedge 44 are given a nitride hardening treatment to facilitate assembly without galling or sticking, which could prevent full tightening. Seals 50 and 60 and bolts 72A, 72B, 74A, 74B, 76A, 76B, and 76C are typically age hardened Ni—Cr—Fe alloy X-750 to provide high strength to minimize their size in the limited available access space. The alloy X-750 also provides good corrosion resistance and resistance to galling during engagement of the threaded connections.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A downcommer coupling apparatus for coupling a downcommer pipe of a core spray line to a core shroud in a nuclear reactor, the downcommer pipe comprising at least one dowel bolt opening said apparatus comprising:

a wedge housing configured to engage a downcommer pipe, said wedge housing comprising at least one dowel bolt opening;

a wedge flange engaging said wedge housing;

a wedge having a plurality of segments, said wedge extending into said wedge housing; and at least one dowel bolt, each said dowel bolt extending through a dowel bolt opening in said housing, each said dowel bolt configured to extend through a dowel bolt opening in the downcommer pipe.

2. A downcommer coupling apparatus in accordance with claim 1 wherein said wedge flange and wedge housing each comprise at least one wedge flange bolt opening, and wherein said apparatus further comprises at least one wedge flange bolt configured to extend through said wedge flange bolt openings when aligned.

3. A downcommer coupling apparatus in accordance with claim 1 further comprising a cylindrical pipe and an elbow, wherein said pipe first end coupled to said wedge housing and said elbow coupled to said pipe second end.

4. A downcommer coupling apparatus in accordance with claim 3 further comprising a lower flange coupled to said elbow second end, said elbow second end configured to couple to the core shroud.

5. A downcommer coupling apparatus in accordance with claim 4 wherein said lower flange comprises at least one lower flange bolt opening, and wherein said downcommer coupling apparatus further comprises at least one lower flange bolt for extending through said lower flange bolt opening.

6. A downcommer coupling apparatus in accordance with claim 5 further comprising a nutbar having at least one nut for engaging said lower flange bolt.

7. A downcommer coupling apparatus in accordance with claim 5 further comprising a clamp for engaging said lower flange bolt.

8. A downcommer coupling apparatus in accordance with claim 1 further comprising a pipe seal engaging said wedge housing, said pipe seal configured to engage the downcommer pipe.

9. A downcommer coupling apparatus in accordance with claim 8 wherein said pipe seal is a flexible double diaphragm type seal.

10. A downcommer coupling apparatus in accordance with claim 3 further comprising a shroud seal engaging said lower flange, said shroud seal configured to engage a core shroud.

11. A downcommer coupling apparatus for coupling a downcommer pipe of a core spray line to a core shroud in a nuclear reactor, the downcommer pipe including at least one dowel bolt opening, said apparatus comprising:

a wedge housing comprising a frusto-conical portion and a flange located at a large diameter end of said frusto-conical portion, said wedge housing further comprising at least one threaded dowel bolt opening, each said dowel bolt opening configured to substantially align with a dowel bolt opening in a downcommer pipe;

a wedge comprising a plurality of segments sized to extend into said wedge housing;

a wedge flange; and at least one dowel bolt extending through and threadedly engaging said wedge housing dowel bolt opening and configured to extend through the at least one dowel bolt opening in the downcommer pipe.

12. An apparatus in accordance with claim 11 wherein said wedge flange and said wedge housing flange each comprise at least one flange bolt opening, said apparatus further comprising at least one flange bolt extending through said at least one opening in said wedge flange and said wedge housing flange.

13. An apparatus in accordance with claim 11 further comprising a cylindrical pipe having a first end and a second end, and an elbow having a first end and a second end, said pipe first end coupled to said wedge housing and said pipe second end coupled to said elbow first end.

14. An apparatus in accordance with claim 11 further comprising a lower flange coupled to said second end of said elbow.

15. An apparatus in accordance with claim 14 wherein said lower flange comprises at least one bolt opening, and said apparatus further comprising at least one lower flange bolt extending through said at least one bolt opening in said lower flange.

16. An apparatus in accordance with claim 15 further comprising a nutbar comprising at least one nut theadedly engaging said at least one lower flange bolt.

17. An apparatus in accordance with claim 15 further comprising a clamp engaging said at least one lower flange bolt.

18. An apparatus in accordance with claim 11 further comprising a pipe seal engaging said wedge housing and configured to engage the downcommer pipe.

19. An apparatus in accordance with claim 18 wherein said pipe seal comprises a flexible double diaphragm type pipe seal.

20. An apparatus in accordance with claim 14 further comprising a shroud seal engaging said lower flange and configured to engage a shroud.

* * * * *